US012398063B2

(12) United States Patent
Milicevic et al.

(10) Patent No.: US 12,398,063 B2
(45) Date of Patent: Aug. 26, 2025

(54) PLASMA CHEMICAL VAPOR DEPOSITION PROCESS

(71) Applicant: Draka Comteq B.V., Delft (NL)

(72) Inventors: Igor Milicevic, Helmond (NL); Mattheus Jacobus Nicolaas Van Stralen, Tilburg (NL); Gertjan Krabshuis, Sint Oedenrode (NL); Antonius Henricus Elisabeth Breuls, Urmond (NL)

(73) Assignee: Draka Comteq B.V., Delft (NL)

( * ) Notice: Subject to any disclaimer, the term of this patent is extended or adjusted under 35 U.S.C. 154(b) by 244 days.

(21) Appl. No.: 18/127,194

(22) Filed: Mar. 28, 2023

(65) Prior Publication Data
US 2023/0312392 A1    Oct. 5, 2023

(30) Foreign Application Priority Data
Mar. 30, 2022    (NL) ..................................... 2031450

(51) Int. Cl.
C03B 37/018    (2006.01)
C03B 37/027    (2006.01)

(52) U.S. Cl.
CPC .... *C03B 37/0183* (2013.01); *C03B 37/01869* (2013.01); *C03B 37/027* (2013.01)

(58) Field of Classification Search
None
See application file for complete search history.

(56) References Cited

U.S. PATENT DOCUMENTS

| 4,741,747 | A | 5/1988 | Geittner et al. |
| 7,068,899 | B2 | 6/2006 | Milicevic et al. |
| 7,522,800 | B2 | 4/2009 | Milicevic et al. |
| 2005/0041943 | A1 | 2/2005 | Milicevic et al. |
| 2006/0193581 | A1 | 8/2006 | Milicevic et al. |
| 2008/0063812 | A1* | 3/2008 | Deckers .............. C03B 37/0183 427/575 |
| 2009/0003787 | A1 | 1/2009 | Hartsuiker et al. |
| 2009/0022906 | A1* | 1/2009 | Van Stralen ...... C03B 37/01876 427/575 |

(Continued)

FOREIGN PATENT DOCUMENTS

| CN | 1403397 A1 | 3/2003 |
| EP | 2008979 A1 | 12/2008 |
| WO | 2004/101458 A1 | 11/2004 |

OTHER PUBLICATIONS

CN1403397A Human Assisted Translation performed by STIC Feb. 28, 2025. (Year: 2025).*

*Primary Examiner* — Lisa L Herring
(74) *Attorney, Agent, or Firm* — Additon, Pendleton & Witherspoon, P.A.

(57) ABSTRACT

A method for manufacturing a primary preform for optical fibers via an internal plasma chemical vapor deposition (PCVD) process in a hollow silica substrate tube having a supply side and a discharge side includes depositing doped or non-doped silica layers on the inner surface of the hollow substrate tube by supplying glass-forming gasses to the interior of the hollow substrate tube via the supply side thereof, and by creating a plasma reaction zone in the interior of the hollow substrate tube via microwave radiation having a microwave power, wherein the microwave power is decreased during the depositing.

20 Claims, 1 Drawing Sheet

(56) References Cited

U.S. PATENT DOCUMENTS

2013/0167593 A1* 7/2013 Milicevic ............ C03B 37/0183
                                                              65/382
2014/0322456 A1* 10/2014 Milicevic .......... C03B 37/01807
                                                             427/575

* cited by examiner

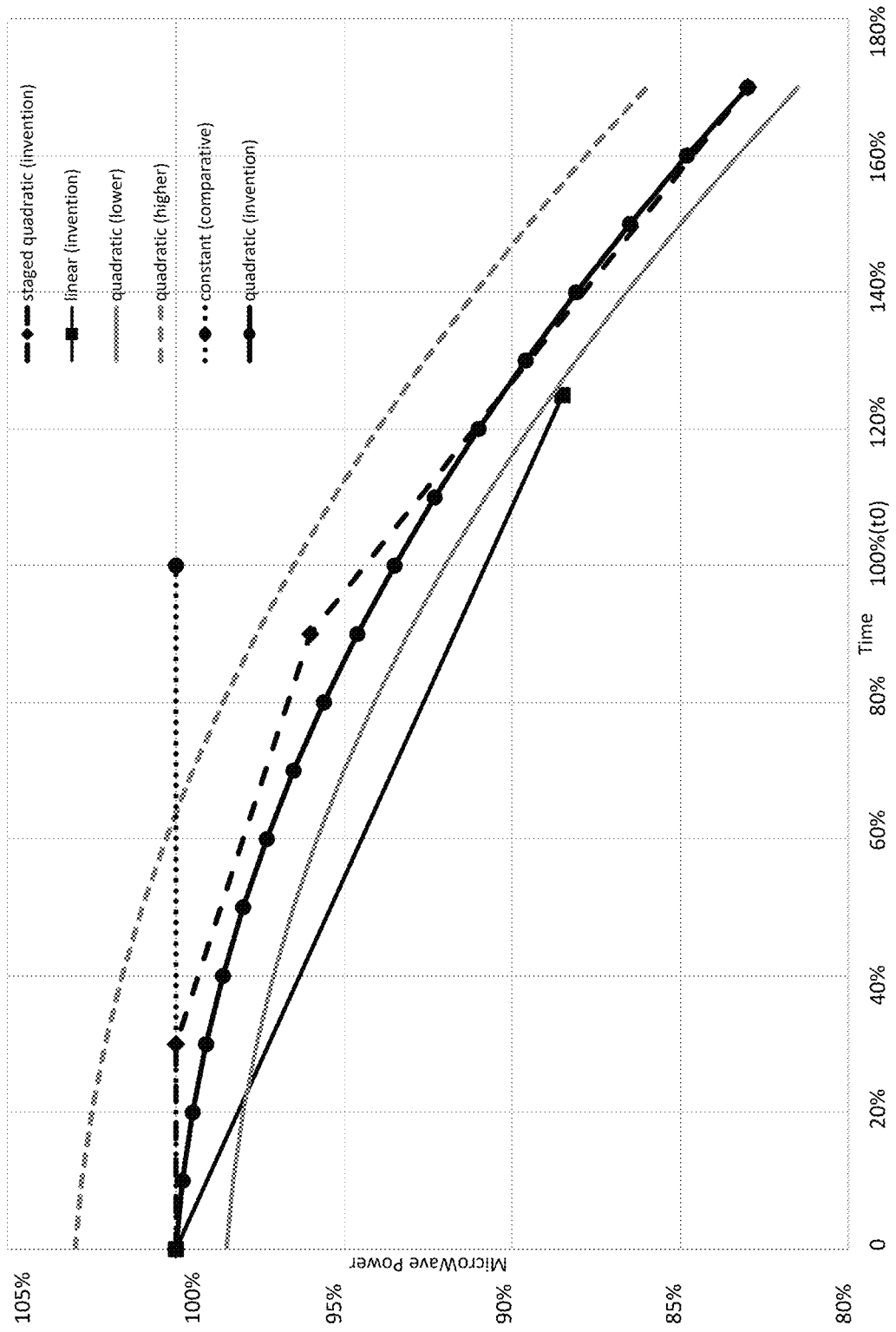

PLASMA CHEMICAL VAPOR DEPOSITION PROCESS

CROSS-REFERENCE TO PRIORITY APPLICATION

This application claims the benefit of pending Dutch Application No. 2031450 (filed Mar. 30, 2022, at the Netherlands Patent Office), which is hereby incorporated by reference in its entirety.

FIELD OF THE INVENTION

The present invention relates to a method for manufacturing a primary preform for optical fibers by means of an internal plasma chemical vapor deposition (PCVD) process. The present invention further relates to a method for forming an optical fiber and to the primary preform and optical fiber obtainable according to these methods.

BACKGROUND

In a plasma chemical vapor deposition (PCVD) process multiple silica layers are deposited on the inner wall of a hollow substrate tube. During the PCVD process reactive glass-forming gasses, possibly doped, are reacted inside a hollow substrate tube by means of a plasma, resulting in the deposition of one or more silica layers on the inner surface of the hollow substrate tube. Such reactive gasses are supplied on one side of the substrate tube, viz., the supply side, and as a result of the special process conditions they form silica layers on the interior wall of the substrate tube. An energy source is moved back and forth along the length of the substrate tube for forming the silica layers. The energy source, in particular a plasma generator (resonator), supplies high-frequency energy (microwaves), thereby generating a plasma in the interior of the substrate tube, under which plasma conditions the reactive glass-forming gasses will react. During the PCVD process the inner diameter of the substrate tube decreases and the wall thickness increases. This results in changing reaction conditions and adverse effects that limit the amount of silica that may be deposited on the inner surface of the substrate tube. There is, therefore, a need for a process that can increase the amount of silica deposited in the substrate tube during the PCVD process.

Applicant's European Patent Application No. EP2008979 A1, which is hereby incorporated by reference in its entirety, discloses a PCVD process for manufacturing a preform during which process a so-called transition deposition is carried out between the deposition of one phase and the deposition of the other phase and during which the flow of gasses is changed.

Applicant's International Publication No. WO 2004/101458 A1 and its counterpart U.S. Pat. Nos. 7,068,899 and 7,522,800, each of which is hereby incorporated by reference in its entirety, disclose a PCVD process for manufacturing a preform that reduces taper near the ends of the preform by amending the plasma velocity near the reversal points.

U.S. Pat. No. 4,741,747, which is hereby incorporated by reference in its entirety, discloses a PCVD process for manufacturing a preform that reduces taper near the ends of the preform by moving the plasma in the area of at least one reversal point nonlinearly with time.

SUMMARY

It is an exemplary object of the present invention to provide an improved PCVD process that solves one or more of the drawbacks of prior art processes. It is a further exemplary object of the present invention to provide an improved PCVD process that allows the deposition of an increased amount of silica. The present invention achieves one or more of these exemplary objects by the exemplary aspects disclosed below and embodiments thereof.

In a first exemplary aspect, the invention relates to a method for manufacturing a primary preform for optical fibers by means of an internal plasma chemical vapor deposition (PCVD) process in a hollow silica substrate tube, said hollow substrate tube having a supply side and a discharge side. The exemplary method comprises depositing doped or non-doped silica layers on the inner surface of said hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing of the silica layers (e.g., a microwave-power decrease).

In another exemplary aspect, the present invention relates to a method further comprising, after the execution of the PCVD process, subjecting the primary preform to a collapsing treatment (e.g., collapsing the hollow primary preform) so as to form a solid primary preform.

In another exemplary aspect, the present invention relates to a method for forming an optical fiber by heating the solid primary preform at one end, from which heated end of the solid primary preform the optical fiber is drawn (e.g., drawing an optical fiber from the heated end of the solid primary preform).

In another exemplary aspect, the present invention is related to a primary preform, solid primary preform, or optical fiber obtained with the inventive methods.

Corresponding exemplary embodiments disclosed below for the method of one aspect are also applicable for the other methods and aspects according to the present invention.

List of Definitions

The following definitions are used in the present description and claims to define the stated subject matter. Other terms not cited below are meant to have the generally accepted meaning in the field.

"Primary preform" as used in the present description means: a hollow substrate tube having PCVD deposited silica layers on the inside thereof. A primary preform is transformed into a solid primary preform by means of a collapsing process.

"Collapsing process" or "collapsing treatment" as used in the present description means: thermally treating the primary preform to collapse and/or consolidate it into a massive solid rod.

"Solid primary preform" as used in the present description means: a solid rod or core rod that is obtained by collapsing of a primary preform.

"Final preform" as used in the present description means: a solid rod obtained by externally providing a (solid) primary preform with extra (layers of) silica.

"Depositing" as used in the present description means: depositing doped or non-doped silica layers on the inner surface of the hollow substrate tube by supplying glass-forming gasses to the interior of the hollow substrate tube via the supply side thereof and by creating a plasma reaction zone in the interior of the hollow substrate tube by means of microwave radiation having a microwave power.

"Silica" as used in the present description means: any substance in the form of $SiO_x$, whether or not stoichiometric, and whether or not crystalline or amorphous, optionally doped.

"Glass forming gasses" as used in the present description means: one or more gaseous compounds or gasses used during the PCVD process and which form silica.

"Total flow rate" as used in the present description means: the combined flow rate of all glass-forming gasses used. The flow rate is normally expressed as a volumetric flow range expressed as a certain value for SLM or SCCM, being the standard liters per minute or standard cubic centimeters per minute.

"Non-doped silica layers" as used in the present description means: undoped vitrified silica mostly of amorphous $SiO_2$. It may comprise chlorine in an amount of up to 1500 ppm and still be considered to be undoped.

"Doped silica layers" as used in the present description means: vitrified silica which comprises one or more dopants.

"Dopant" as used in the present description means: a compound or composition that is present in the silica layer and that has an effect on the refractive index of the silica. It can, for example, be a down dopant, viz., a dopant decreasing the refractive index, such as fluorine or boron (e.g., introduced as a precursor in the form of $F_2$, $C_2F_8$, $SF_6$, $C_4F_8$ or $BCl_3$). It can, for example, be an up-dopant, viz., a dopant increasing the refractive index, such as germanium (e.g., introduced as a precursor in the form of $GeCl_2$ (germanium dichloride) or $GeCl_4$ (germanium tetrachloride)). Dopants can be present in the silica either in the interstices of the silica (e.g., in the case of fluorine) or they may be present as an oxide (e.g., in the case of germanium, aluminum, phosphorus, or boron).

"Soot" as used in the present description means: incompletely vitrified silica (i.e., not vitrified or partly vitrified). It can be either non-doped or doped.

"Inner surface" as used in the present description means: the inside surface of the substrate tube, being the surface of the inner wall of the substrate tube.

"Plasma reaction zone" as used in the present description means: the zone that is formed by the plasma in which the glass-forming gasses react to form silica.

"Microwave radiation" as used in the present description means: electromagnet radiation in the microwave (wavelength) range being from about 1 meter to about 1 millimeter corresponding to frequencies between 300 MHz and 300 GHz, respectively. Typical examples of suitable microwave radiation include a frequency of about 2.45 GHz, or of about 5.6 GHz, or of about 890 MHz.

"Microwave power" as used in the present description means: the power or wattage of the microwave radiation used, expressed in watt (W).

"Plasma that moves back and forth over the length of the substrate tube" as used in the present description means: either by the movement of the applicator over the substrate tube or by the movement of the substrate tube inside of the central aperture of the applicator, the plasma moves back and forth. Even if the applicator is considered stationary and the substrate tube moves axially, this is considered to be a plasma moving back and forth according to the present invention.

"Moved back and forth" as used in the present description means: a reciprocating movement or moving backwards and forwards in a straight line.

"Pass" as used in the present description means: a part of the PCVD process defined by one forth and one back movement of the plasma along the length of the substrate tube, or vice versa. The plasma starts at one end of the available length of the substrate tube, moves forth towards a reversal point near the other end of the available length of the substrate tube, and then moves back towards the one end to complete one pass. Available length of the substrate tube is considered to be the length of the substrate tube over which the applicator may move, excluding both ends of the substrate tube that are mounted in the clamps of a lathe.

"Decreases continuously" as used in the present description means: a decrease that is substantially continuous in time. For example, during each pass, the microwave power is at least (slightly) less than during the previous pass, even if the microwave power is constant during each respective pass. This term is intended to embrace incremental microwave-power decreases for each sequential pass. This kind of regular microwave-power decrease (e.g., for each pass) can be contrasted with a temporal, step-wise decrease in which the microwave power is kept constant for a certain time period (e.g., for at least several passes) and then instantly dropped (i.e., reduced) to be kept constant again thereafter.

"Stage of a decrease" as used in the present description means: a temporal part of the PCVD process. During a stage of a decrease, the decrease of the microwave power is typically linear (e.g., substantially linear with only slight power variations, if any). When going from one stage of decrease to another stage of decrease, the degree of the decrease typically changes.

"Constant stage" as used in the present description means: a temporal part of the PCVD process. During a constant stage there is no decrease in the microwave power.

"Degree of the decrease" as used in the present description means: the average decrease of the microwave power over the duration of a stage.

"Quadratic decrease" as used in the present description means: there is a continuous decrease of the microwave power in time; the curve of microwave power against time has a parabolic shape. There are no separate stages in this embodiment because there are no parts of the process in which the decrease is linear.

"Linear decrease" as used in the present description means: a decrease that is linear in time plus or minus 2 percent. In other words, during each pass, the microwave power decreases the same amount.

"Power ramp" or microwave power ramp" as used in the present description means: the profile of the microwave power decrease. It is a curve of the microwave power against deposition time.

The foregoing illustrative summary, other objectives and/or advantages of the present disclosure, and the manner in which the same are accomplished are further explained within the following detailed description and its accompanying drawing.

BRIEF DESCRIPTION OF THE DRAWING

The present invention is described hereinafter with reference to the accompanying drawing. Inventive aspects may be embodied in many different forms and should not be construed as limited to the examples depicted in the drawing.

The FIGURE shows exemplary microwave power ramps according to the present invention compared with a linear, constant microwave power according to the prior art (black dotted line). The microwave power ramps according to the invention are a linear decreasing microwave power ramp (black solid line), a decreasing microwave power ramp having several stages that resemble a quadratic fit (black dashed line), and a fully quadratic decreasing microwave power ramp (black solid line with black circles). In addition, exemplary boundaries are depicted as decreasing microwave power ramps in a solid grey line (lower preferred limit) and dashed grey line (upper preferred limit).

DETAILED DESCRIPTION

Various aspects and features are herein described with reference to the accompanying FIGURE. Details are set forth to provide a thorough understanding of the present disclosure. It will be apparent, however, to those having ordinary skill in the art that the disclosed plasma chemical vapor deposition (PCVD) processes may be practiced or employed without some or all of these specific details. As another example, features disclosed as part of one embodiment can be used in another embodiment to yield a further embodiment. Sometimes well-known aspects are not described in detail to avoid unnecessarily obscuring the present disclosure. This detailed description is thus not to be taken in a limiting sense, and it is intended that other embodiments are within the spirit and scope of the present disclosure.

The present invention relates to a method for manufacturing a primary preform for optical fibers by means of an internal plasma chemical vapor deposition (PCVD) process in a hollow silica substrate tube, the hollow substrate tube having a supply side and a discharge side. An exemplary method comprises depositing doped or non-doped silica layers on the inner surface of the hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing. Glass-forming gasses (e.g., doped and/or non-doped) are supplied to the interior of the substrate tube via one side of the substrate tube, called the supply side. The gasses are flushed through the hollow substrate tube, and a gas delivery system is typically used to feed gasses. Examples of these glass-forming gasses are $SiCl_4$, $GeCl_4$, $O_2$, and $C_2F_6$.

Inside the hollow substrate tube these gasses are reacted by means of a plasma that is present (e.g., created) within the substrate tube. The PCVD process makes use of an energy source (an applicator) that is connected to a microwave source or microwave generator (typically a magnetron) that provides microwave radiation having a certain microwave power. The microwave generator generates microwaves that are sent to a plasma generator having a cylindrical cavity extending therethrough. The microwave power can be measured using a microwave measuring unit that may be present in the microwave circuit. The applicator moves back and forth along the axial direction of the substrate tube. The speed of the applicator is typically about 20 meters per minute and typically has a range of 2 to 30 meters per minute. Inside the substrate tube, the microwave power creates a plasma that activates a reaction of the glass-forming gasses, which results in the deposition of thin silica layers (e.g., doped and/or non-doped silica) within the substrate tube, on the inside wall thereof. The substrate tube and applicator are positioned inside a furnace.

The plasma zone that is created moves back and forth along the longitudinal axis of the hollow substrate tube between a reversal point located near the supply side of the hollow substrate tube and a reversal point located near the discharge side of the hollow substrate tube. As noted, one forth and back movement is called a pass. During each pass, a layer of silica is deposited on the inner surface of the substrate tube along the length of the substrate tube. The total number of silica layers deposited (correlated to the total number of passes) during a PCVD process may vary but is typically between 500 and 5,000.

According to an exemplary method of the invention, during the PCVD deposition process the microwave power is decreased. Without wishing to be bound to any particular theory, the present inventors have observed that by decreasing the microwave power, the ratio of the microwave power to the rate of deposition (e.g., the amount of silica deposited in the substrate tube per minute) is also decreased. This was found to have a positive effect on the process, such that the total amount of silica deposited inside a substrate tube is increased compared with a process in which the microwave power is not decreased. In the latter, for instance, the heat of the plasma causes the oxide dopants deposited in the silica layers to evaporate with increasing wall thickness of the substrate tube (e.g., oxide-dopant evaporation worsens as the as deposited silica accumulates within the substrate tube). These evaporated dopants are transported with the gas flow within the substrate tube and condense at arbitrary positions, which causes breakage of the primary preforms during collapsing or index variations in the final optical fiber. To preclude such issues, the PCVD process is shortened and concluded before these adverse effects occur.

The present method is used during the manufacturing of primary preforms. Prior to the first primary preform being manufactured (e.g., prior to the actual production), optimal settings are determined for the microwave power and decrease thereof. These settings, for example, may be determined by weighing the substrate tube prior to the start of the depositing and every so often during deposition. By the weighing the substrate tube, the amount of silica that has been deposited can be determined as well as the thickness of the deposited layers. Several test runs having different decrease profiles for the microwave power can be done, and optimal settings for the specific process parameters (e.g., starting inner diameter of the substrate tube, kinds of gasses, flow rate of gasses) can be determined. Without wishing to be bound to a particular theory, the present inventors have observed that when the inner diameter of the substrate tube decreases during the PCVD process (i.e., by the deposition of silica), the central cavity becomes smaller, and plasma length increases when the microwave power stays the same. This lengthening of the plasma was observed to lead to an overly extended plasma that caused undesirable side effects at the edges of the plasma. The present inventors have observed that it is desirable to reduce plasma lengthening during the PCVD process and that that was obtainable by decreasing the plasma power over time.

In exemplary embodiments, the microwave power is decreased by at least 5 percent, typically by at least 10 percent, such as by at least 15 percent or by at least 17 percent, during the depositing of the silica layers. In other exemplary embodiments, the microwave power is decreased by between 15 and 25 percent, typically between 17 and 22 percent, such as between 18 and 21 percent (e.g., approximately 20 percent), during the depositing of the silica layers. In further exemplary embodiments, the microwave power is decreased by at most 50 percent, typically at most 30 percent, during the depositing of the silica layers. When the microwave power is decreased to a too-low level, an increase in unattached soot particles would be obtained. Such soot particles are carried by the gas flow and deposited in a colder region (e.g., just behind the PCVD furnace). This leads to clogging. The present inventors have observed that such exemplary decreases during the depositing provides a good balance between amount of silica that is deposited without soot formation. Those having ordinary skill in the art that "during the depositing" means during the total duration of the PCVD process.

In an exemplary embodiment, the microwave power is decreased continuously during at least a part of the depositing, typically during at least 50 percent, further typically during at least 75 percent of the depositing. The present inventors have observed that the effect of the invention can be observed best if, at least during 50 percent, or even at least 75 percent, of the total duration of the PCVD process, there is a continuous decrease in microwave power (e.g., incremental microwave-power decreases for sequential passes).

In another exemplary embodiment, the decrease comprises two or more stages, typically a number in the range of two to six stages (e.g., typically two or three stages) of microwave-power decrease. In this exemplary embodiment, there is not a single, linear continuous decrease but rather a decrease in which the degree of decrease (the "slope" of decrease, being the slope of the graph of microwave power over time) alters after a certain period of time (e.g., presenting as slope inflections such as depicted in the FIGURE). Each stage of microwave-power decrease has an independent degree (slope) of decrease. The present inventors have observed that two or three or four or five or six stages provide good results (e.g., a staged quadratic fit). In an exemplary embodiment, the decrease comprises a linear decrease within one or more stages, (e.g., from stage to stage). Typically, each of the stages has a linear decrease, and each of the stages has a duration of at least 10 percent, typically at least 20 percent, of the total duration of the depositing process. On the boundary of two stages (e.g., when going from one stage to another stage), the amount or degree of decreases alters (e.g., an inflection point). In an exemplary embodiment, the degree of the decrease in each stage is larger than the degree of the decrease in the immediately preceding stage thereof. In addition to stages of decrease, one or more constant stages may be present, typically one constant stage at the start of the PCVD process, such as shown in the FIGURE as the exemplary staged quadratic.

In a further exemplary embodiment, each of the two or more stages of decrease has a duration of at least 10 percent, typically at least 20 percent, of a total duration of the depositing. In other words, the duration of each stage is at least 1/10 of the total duration of the PCVD process. The PCVD process might also include (typically at the start of the process) a certain period of time in which the microwave power is constant, after which the decrease starts.

In a specific exemplary embodiment, the decrease is a quadratic decrease. In this exemplary embodiment, there is a continuous decrease that has a parabolic shape. There are no separate stages in this embodiment. This is shown as the solid black line with black circles in the FIGURE.

In an exemplary embodiment, boundaries (both upper and lower) are determined for each type/diameter of substrate tube, the deposition rate, and other process conditions. For the examples provided in the present description, these preferred boundaries are depicted as a solid grey line (lower boundary) and a dashed grey line (upper boundary) in the FIGURE.

The total flow rate of glass-forming gasses supplied to the interior of the hollow substrate tube may be kept at least substantially constant during the depositing. This is applicable to all of the above embodiments (linear or quadratic, with or without multiple stages). By substantially constant is meant that the flow rate is kept between an increase of 2 percent and a decrease of 2 percent over the duration of the PCVD process.

Alternatively, for example, in case the total flow rate of glass-forming gasses is not kept constant during the depositing, the ratio between the microwave power and total flow rate of glass-forming gasses decreases during the depositing of the silica layers. That is, during the PCVD process, the microwave power is decreased more than the total flow rate of glass-forming gasses is decreased.

In a specific exemplary embodiment, the microwave power is decreased by 15 to 25 percent during the depositing, wherein the microwave power is decreased continuously during at least 75 percent of the depositing, wherein the corresponding decrease comprises two stages of a linear decrease, and wherein the degree of the decrease in the second of the two stages is larger than the degree of the decrease in the first of the two stages.

The foregoing exemplary embodiments are related to the provision of a primary preform, and, after all of these exemplary embodiments, an additional step may be carried out. For example, after the deposition has been completed, a hollow substrate tube thus formed may be consolidated (in a collapsing step) so as to obtain a solid primary preform. A solid primary preform, which usually has a diameter of about 2-4 centimeters, may be provided with one or more additional silica layers in an additional process step, called overcladding, to yield a final preform. The final preform will typically have an external diameter of about 5-20 centimeters. These final preforms may be used to draw optical fibers therefrom according to an exemplary aspect of the invention.

The present method helps increase the total amount of silica deposited within a substrate tube. The solid primary preforms obtained by the present method were found to be stable and did not show any signs of cracking.

In another exemplary aspect, the invention relates to a method for forming an optical fiber wherein the solid primary preform obtained is heated at one end and an optical fiber is drawn (e.g., from the heated end of the solid primary preform).

The invention also relates to a primary preform or a solid primary preform directly obtained by a method according to the invention, as well as to an optical fiber directly obtainable by a method according to the invention.

In an exemplary embodiment, the total duration of the depositing is selected so that the desired, predetermined target total thickness of deposited silica layers is obtained.

In an exemplary embodiment, the total duration of the depositing is selected such that the desired predetermined decrease of the inner diameter of the substrate tube is obtained. In an exemplary embodiment, the duration of the PCVD process is chosen such that the deposition of silica layers on the inner surface of said hollow substrate tube is continued until an inner diameter of the substrate tube (e.g., diameter of the central cavity) has decreased by at least 25 percent, typically decreased by at least 40 percent.

The present method may be considered to comprise one or more imaginary phases or stages ($a_1$ to $a_n$) that are successive in time. Each phase/stage ($a_1$ to $a_n$) has a certain duration, and each phase/stage comprises the deposition of a plurality of doped and/or non-doped silica layers on the inner surface of the hollow substrate tube (phase $a_1$) or on the previously deposited silica layers (phases $a_2$-$a_n$). According to the present method, the microwave power decreases over time. In an exemplary embodiment, the decrease of the microwave power per unit of time of a subsequent phase ($a_2$ to $a_n$) of the number of phases is greater than the decrease of microwave power per unit of time of the preceding phase ($a_1$ to $a_{n-1}$ respectively) thereof. In an exemplary embodiment, the microwave power is constant during the first stage ($a_1$).

Clauses

1. A method for manufacturing a primary preform for optical fibers by means of an internal plasma chemical vapor deposition (PCVD) process in a hollow silica substrate tube, said hollow substrate tube having a supply side and a discharge side, which method comprises depositing doped or non-doped silica layers on the inner surface of said hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing.

2. The method according to clause 1, wherein the microwave power is decreased by at least 5 percent, typically at least 10 percent, typically 15 to 25 percent, during said depositing.

3. The method according to clause 1 or 2, wherein the microwave power is decreased continuously during at least a part of the depositing, typically during at least 50 percent, further typically during at least 75 percent of the depositing.

4. The method according to clause 3, wherein the decrease comprises two or more stages, typically a number in the range of 2 to 6 stages, further typically two or three stages, of a decrease.

5. The method according to clause 4, wherein each of the two or more stages of decrease has a duration of at least 10 percent, typically at least 20 percent, of a total duration of the depositing.

6. The method according to clause 4 or 5, wherein the degree of the decrease in each stage is larger than the degree of the decrease in the immediately preceding stage thereof.

7. The method according to any one of the preceding clauses 1-6, wherein the decrease is a linear decrease.

8. The method according to any one of the preceding clauses 1-3, wherein the decrease is a quadratic decrease.

9. The method according to any one of the preceding clauses, wherein the total flow rate of glass-forming gasses supplied to the interior of the hollow substrate tube is kept at least substantially constant during the depositing.

10. The method according to any one of the clauses 1-8, wherein the ratio between the microwave power and the total flow rate of glass-forming gasses supplied to the interior of the hollow substrate tube is decreasing during said depositing.

11. The method according to clause 1, wherein the microwave power is decreased by 15 to 25 percent during said depositing, wherein the microwave power is decreased continuously during at least 75 percent of the depositing, wherein the decrease comprises two stages of a linear decrease, and wherein the degree of the decrease in the second of the two stages is larger than the degree of the decrease in the first of the two stages.

12. The method according to any one of the preceding clauses, further comprising, after the execution of the PCVD process, subjecting the primary preform to a collapsing treatment so as to form a solid primary preform.

13. A method for forming an optical fiber wherein the solid primary preform obtained in accordance with a method according to clause 12 is heated at one end, from which heated end of the solid primary preform the optical fiber is drawn.

14. A primary preform directly obtainable by a method according to any one of the preceding clauses 1-11, or a solid primary preform or obtainable by a method according to clause 12.

15. An optical fiber directly obtainable by a method according to clause 14.

Other variations to the disclosed embodiments can be understood and effected by those skilled in the art in practicing the claimed invention, from a study of the FIGURE, the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

EXAMPLES

The present invention is further explained based on the following examples, which are illustrative only and not considered limiting to the present invention.

Comparative Examples—No Decrease in Microwave Power

In the comparative examples, the absorbed microwave power was not decreased and was kept constant at a value in the range of 7,000 to 11,000 watts (considered to be 100 percent for this and the other examples) for the total duration of the process being between 5 and 15 hours. The flow rate of the glass-forming gasses was not altered during the process. Three different durations of the PCVD process were tested, being $t_0$ (selected between 5 and 15 hours) which is set to 100 percent, $t_0$ +10% (viz., 110 percent), and $t_0$ +20% (viz., 120 percent).

When the process was stopped at $t_0$ +20%, it was found that about 5 percent of the primary preforms broke during collapsing, and optical fibers drawn from the remaining 95 percent of the preforms showed perturbations in the refractive index along the length of the optical fibers.

When the process was stopped at $t_0$ +10%, the breakage of primary preforms decreased, and the number of refractive index perturbations in the optical fibers also decreased significantly.

When the process was stopped at $t_0$, a stable process was obtained with only incidental breakage of primary preform during collapsing, caused by other factors and without noticeable refractive index perturbations in the optical fibers obtained.

This showed that a duration of $t_0$ is the maximum duration possible without primary preform breakage and without refractive index perturbations in the optical fibers according to the comparative process.

The FIGURE shows in a horizontal dotted line with black circles the microwave power during this process, which is constant at 100 percent until the process ends. As is clear from the FIGURE, the constant linear microwave power of this representative comparative example crosses the preferred upper limit (dashed grey line) at a time of approximately 65 percent of to. After that, evaporation of dopants could arise, which are transported with the gas flow in the substrate tube and which condense at arbitrary positions. As noted, this causes breakage of the primary preforms during collapsing or index variations in the final optical fiber. That is why the comparative process has to be stopped at $t_0$.

Example 1—Linear Power Ramp

In this example, the microwave power was decreased continuously and linearly in one single stage. The same kind of substrate tubes as those used in the comparative examples were used, the same flow rate of the glass-forming gasses was used, and the flow rate was not altered during the process. The absorbed microwave power started at the same power (100 percent) as used in the comparative examples and was decreased linearly to a value of 88 percent of the starting power. This power ramp is shown as the solid black line with black squares in the FIGURE. The process ended at $t_0$ +25% (viz., 125 percent), and so the duration of this process was 25 percent longer than the $t_0$ process of the comparative examples.

With this linear power ramp, the present inventors have observed that, after collapsing, a solid primary preform was obtained with up to 23 percent more deposited silica compared with the stable, constant process of the comparative examples. With this power ramp, there is no adverse effect observed from the evaporation of dopants. However, after a time period of between 20 percent and 25 percent of $t_0$, the power ramp crosses the preferred lower limit (solid grey line in the FIGURE). This resulted in the formation of substantial amounts of soot and clogging within the substrate tube, leading to a forced stop of the process at $t_0$ +25%. The obtained solid primary preform was stable and did not show any signs of cracking, and optical fibers drawn from this preform did not show noticeable refractive index perturbations.

With similar process conditions the inventors did not succeed in prolonging the process time by 25 percent while continuing the linear power ramp. Attempts to do so resulted in the premature end of the process, caused by accumulated soot blocking the gas flow through the substrate tube.

Example 2—Quadratic Power Ramp

In this example, the microwave power was decreased continuously and in three separate stages, namely one stage with a constant microwave power and two stages of decrease. The same kind of substrate tubes as those used in the comparative examples were used, the same flow rate of the glass-forming gasses was used, and the flow rate was not altered during the process. The absorbed microwave power started at the same starting value (100 percent) as in the comparative examples and Example 1 and stayed there for a period of time equal to 30 percent of $t_0$ (stage 1—constant stage). Then, the microwave power was linearly decreased to a value that was 96 percent of the starting value over a period of time that equals 60 percent of $t_0$ (stage $2=1^{st}$ stage of decrease). Then, the microwave power was linearly decreased further to 82 percent of the starting power over a period of time equal to 80 percent of $t_0$ (stage $3=2^{nd}$ stage of decrease). The degree of decrease in stage 3 was approximately 2.5 times the degree of decrease in stage 2. This power ramp is shown as the dashed black line in the FIGURE with black diamonds. After a time of $t_0$ +70% (viz., 170 percent), the process was stopped.

The present inventors have observed that with an approximate parabolic shape (e.g., piece-wise parabolic) or quadratic fit (e.g., comprising linear or near linear drops within two or more stages), a stable and constant silica deposition efficiency was obtained yielding, after collapsing, a solid primary preform with up to 55 percent more deposited silica compared with the stable, constant process of the comparative examples. This shows that when compared with the comparative examples, the duration of the process can be increased by 70 percent, and when compared with the process of Example 1, the duration can be increased by 36 percent.

The obtained solid primary preform was stable and did not show any signs of cracking, and optical fibers drawn from this preform did not show noticeable refractive index perturbations. The method allows to develop previously impossible amounts of deposition, especially for products that are prone to crack.

The present inventors have observed that when the overall microwave power is too high, such as a microwave power above the upper quadratic curve (in the FIGURE above the dashed grey line starting with a microwave power of 103 percent compared with the exemplary 100-percent starting power of the examples), substantial $GeO_2$ evaporation is observed. As discussed, this leads to variations/perturbations in the refractive index and to primary preform breakage, which requires shortening of the deposition process in order to prevent these issues.

The present inventors have observed that when the overall microwave power is too low, being a microwave power below the lower quadratic curve (in the FIGURE below the solid grey line starting at a microwave power of 98 percent compared to the exemplary 100-percent starting power of the examples), no substantial $GeO_2$ evaporation is observed, thereby allowing a longer processing time. However, some soot formation is observed, leading to a pressure increase. This, in turn, leads to a premature end of the process, even though the processing time is significantly longer than without decreasing microwave power.

The present inventors have observed that then the overall microwave power remains within the preferred boundaries during the full PCVD process, no substantial $GeO_2$ evaporation is observed with only limited soot formation. This facilitates significantly longer processing time, which allows more silica to be deposited without any adverse effects.

Other variations of the disclosed embodiments can be understood and effected by those of ordinary skill in the art in practicing the present invention by studying the FIGURE, the disclosure, and the appended claims.

In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A method for manufacturing a primary preform for optical fibers by means of an internal plasma chemical vapor deposition (PCVD) process in a hollow silica substrate tube, the hollow substrate tube having a supply side and a discharge side, which method comprises depositing doped or non-doped silica layers on the inner surface of the hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing, wherein the microwave-power is decreased continuously during a decrease comprising two or more stages of microwave-power decrease, and wherein a degree of the microwave-power decrease in each stage is larger than the degree of the microwave-power decrease in the immediately preceding stage thereof.

2. The method according to claim 1, wherein the microwave power is decreased by at least 5 percent during the depositing.

3. The method according to claim 1, wherein the microwave power is decreased by 15 to 25 percent during the depositing.

4. The method according to claim 1, wherein the microwave power is decreased continuously during at least 50 percent of the depositing.

5. The method according to claim 1, wherein a total flow rate of glass-forming gasses supplied to the interior of the hollow substrate tube is kept at least substantially constant during the depositing.

6. The method according to claim 1, wherein a ratio between the microwave power and a total flow rate of glass-forming gasses supplied to the interior of the hollow substrate tube is decreasing during the depositing.

7. The method according to claim 1, wherein the steps of (i) depositing doped or non-doped silica layers on the inner surface of the hollow substrate tube and (ii) creating a plasma reaction zone in the interior of the hollow substrate tube produces a primary preform, and further comprising subjecting the primary preform to a collapsing treatment so as to form a solid primary preform, and then heating an end of the solid primary preform and drawing an optical fiber from the heated end of the solid primary preform.

8. A method for manufacturing a primary preform for optical fibers by means of an internal plasma chemical vapor deposition (PCVD) process in a hollow silica substrate tube, the hollow substrate tube having a supply side and a discharge side, which method comprises depositing doped or non-doped silica layers on the inner surface of the hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing, and wherein the microwave-power decrease is a linear decrease.

9. The method according to claim 8, wherein the microwave power is decreased by at least 5 percent during the depositing.

10. The method according to claim 8, wherein the microwave power is decreased by 15 to 25 percent during the depositing.

11. The method according to claim 8, wherein a total flow rate of glass-forming gasses supplied to the interior of the hollow substrate tube is kept at least substantially constant during the depositing.

12. The method according to claim 8, wherein a ratio between the microwave power and a total flow rate of glass-forming gasses supplied to the interior of the hollow substrate tube is decreasing during the depositing.

13. The method according to claim 8, wherein the steps of (i) depositing doped or non-doped silica layers on the inner surface of the hollow substrate tube and (ii) creating a plasma reaction zone in the interior of the hollow substrate tube produces a primary preform, and further comprising subjecting the primary preform to a collapsing treatment so as to form a solid primary preform, and then heating an end of the solid primary preform and drawing an optical fiber from the heated end of the solid primary preform.

14. A method for manufacturing a primary preform for optical fibers by means of an internal plasma chemical vapor deposition (PCVD) process in a hollow silica substrate tube, the hollow substrate tube having a supply side and a discharge side, which method comprises depositing doped or non-doped silica layers on the inner surface of the hollow substrate tube by supplying glass-forming gasses to the interior of the hollow substrate tube via the supply side thereof, and by creating a plasma reaction zone in the interior of the hollow substrate tube by means of microwave radiation having a microwave power, wherein the microwave power is decreased during the depositing, and wherein the microwave-power decrease is a quadratic decrease.

15. The method according to claim 14, wherein the microwave power is decreased by at least 5 percent during the depositing.

16. The method according to claim 14, wherein the microwave power is decreased by 15 to 25 percent during the depositing.

17. The method according to claim 14, wherein the microwave power is decreased continuously during at least a part of the depositing.

18. The method according to claim 14, wherein a total flow rate of glass-forming gasses supplied to the interior of the hollow substrate tube is kept at least substantially constant during the depositing.

19. The method according to claim 14, wherein a ratio between the microwave power and a total flow rate of glass-forming gasses supplied to the interior of the hollow substrate tube is decreasing during the depositing.

20. The method according to claim 14, wherein the steps of (i) depositing doped or non-doped silica layers on the inner surface of the hollow substrate tube and (ii) creating a plasma reaction zone in the interior of the hollow substrate tube produces a primary preform, and further comprising subjecting the primary preform to a collapsing treatment so as to form a solid primary preform, and then heating an end of the solid primary preform and drawing an optical fiber from the heated end of the solid primary preform.

* * * * *